Figure 1:
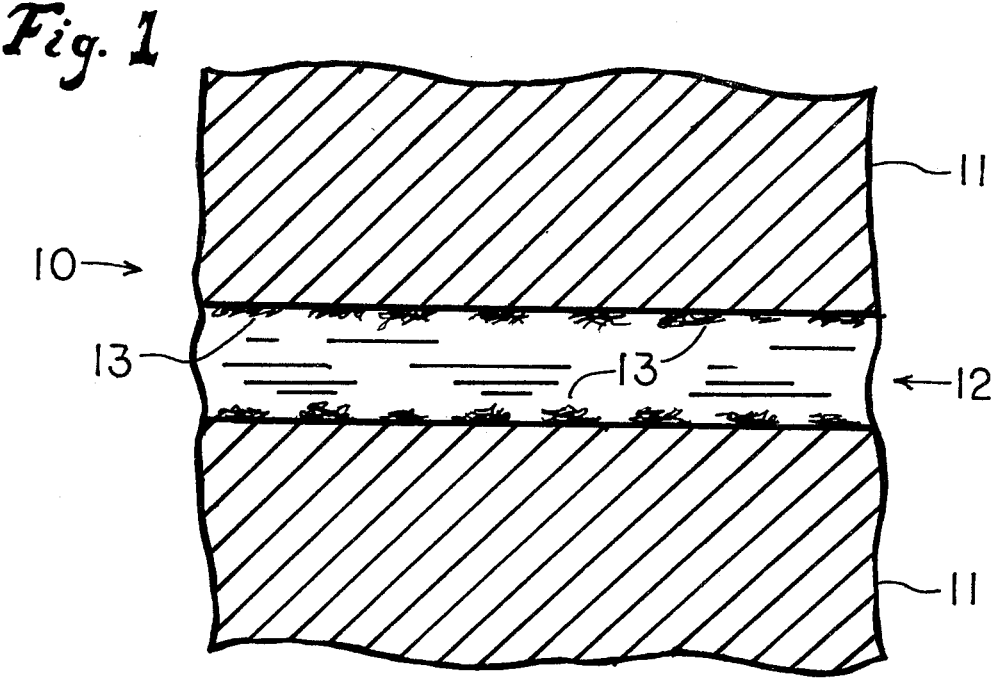

United States Patent [19]

Deborski

[11] 4,269,691
[45] May 26, 1981

[54] OXYGEN ELECTRODE PREPARATION

[75] Inventor: Gary A. Deborski, Midland, Mich.

[73] Assignee: The Dow Chemical Company, Midland, Mich.

[21] Appl. No.: 939,600

[22] Filed: Sep. 5, 1978

[51] Int. Cl.³ .............. C25B 11/16; B05D 5/12; H01M 4/50
[52] U.S. Cl. .............. 204/290 R; 204/291; 427/126.3; 429/224
[58] Field of Search .............. 204/290 R, 291, 290 K; 427/126.3; 429/224

[56] References Cited

U.S. PATENT DOCUMENTS

| | | | |
|---|---|---|---|
| 1,043,937 | 11/1912 | Huth | 204/280 |
| 1,143,828 | 6/1915 | Isherwood | 204/291 |
| 1,296,188 | 3/1919 | Huth | 204/291 |
| 1,423,071 | 7/1922 | Bardt | 204/57 |
| 1,510,172 | 9/1924 | Hosenfeld | 204/290 R |
| 1,510,173 | 9/1924 | Hosenfeld | 204/290 R |
| 1,922,387 | 8/1933 | Muller | 42/229 X |
| 1,971,168 | 8/1934 | Weiss | 252/471 X |
| 2,482,308 | 9/1948 | Wernlund | 252/471 X |
| 3,117,023 | 1/1964 | Tirrell | 204/290 F X |
| 3,310,434 | 3/1967 | Kurdesch | 427/115 |
| 3,491,014 | 1/1970 | Bianchi et al. | 204/242 |
| 3,535,217 | 10/1970 | Amano et al. | 204/96 |
| 3,616,302 | 10/1971 | Osawa et al. | 204/40 |
| 3,627,570 | 12/1971 | Cass et al. | 427/377 |
| 3,645,774 | 2/1972 | Schreck | 427/229 |
| 3,775,284 | 11/1973 | Bennett et al. | 204/290 F |
| 3,855,084 | 12/1974 | Feige | 204/38 R |
| 3,915,837 | 10/1975 | Feige | 204/284 X |
| 3,948,684 | 4/1976 | Armstrong | 427/115 |
| 4,060,476 | 11/1977 | Treptow | 204/290 F |
| 4,072,586 | 2/1978 | De Nora et al. | 204/105 M |
| 4,085,013 | 4/1978 | Hoeckelman | 204/51 |

FOREIGN PATENT DOCUMENTS 83339 7/1971 German Democratic Rep. ..... 204/290 K

OTHER PUBLICATIONS

Tischer, Electrochemica Acta vol. 11, pp. 1309-1323 1966.
Heil, Chem. Abs., vol. 7 p. 3458 1913.
Vosburgh, Chem. Abs., vol. 50, Col. 83c 1956.
Marx, Chem. Abs., vol. 42, Abs. 5356c 1948.
Kokhanov et al., Chem. Abs., vol. 74, Abs. 150, 359w 1971.
Kabanov, Chem. Abs., vol. 78, Abs. 62793e 1973.
Suzuki, Chem. Abs., vol. 78, Abs. 51818v 1973.
Kokhanov et al., Chem. Abs., vol. 79, Abs. 142363a1973.
Kalinovskii et al., Chem. Abs. vol. 81, Abs. 20121v 1974.
Fulman, Chem. Abs., vol. 81, Abs. 57517a 1974.
Hofmann et al., Derwent, 618655/39.
Titanium, Derwent 10379w/06.

Primary Examiner—F. C. Edmundson
Attorney, Agent, or Firm—James H. Dickerson, Jr.

[57] ABSTRACT

Porous electrode bodies are effectively provided with efficient internal surface deposits of manganese oxide(s) catalyst formations by decomposition, under an atmosphere that can either be oxidizing, reducing or inert in nature, at an elevated temperature of a pre-applied anionic manganese salt reagent (notably manganese nitrate but also certain carboxylic acid salts of manganese, etc.) in order to chemically decompose the reagent to advantageous manganese oxide forms within the body pores. Exposure to a reducing environment after catalyst deposition ameliorates the provided catalyst structure by rendering therein more electrocatalytically active variations of the emplaced manganese oxides. Highly reliable and satisfactory electrode products particularly well suited for use as depolarized cathodes, especially in chlor-alkali cells, are obtained from the treatment.

13 Claims, 6 Drawing Figures

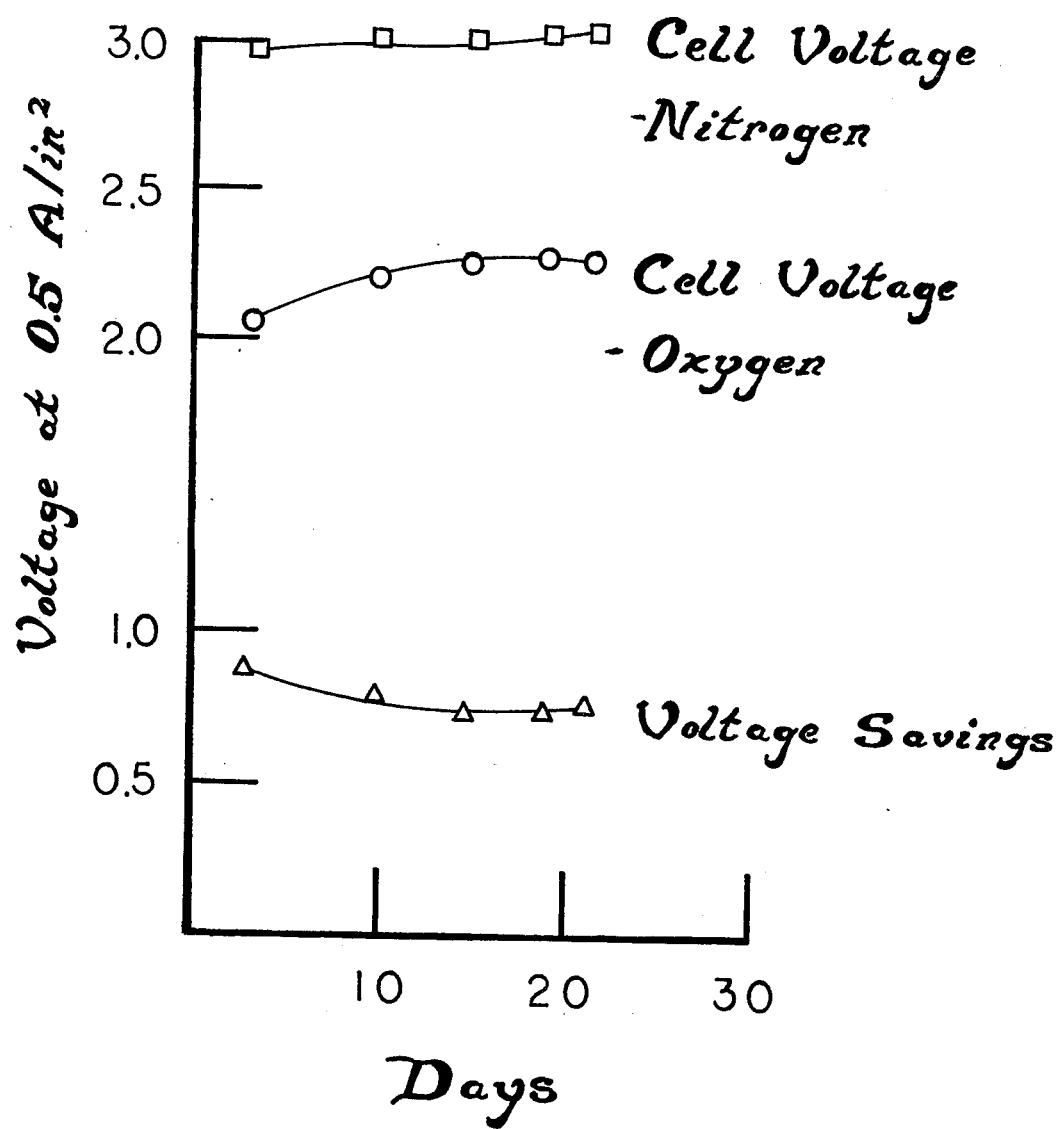

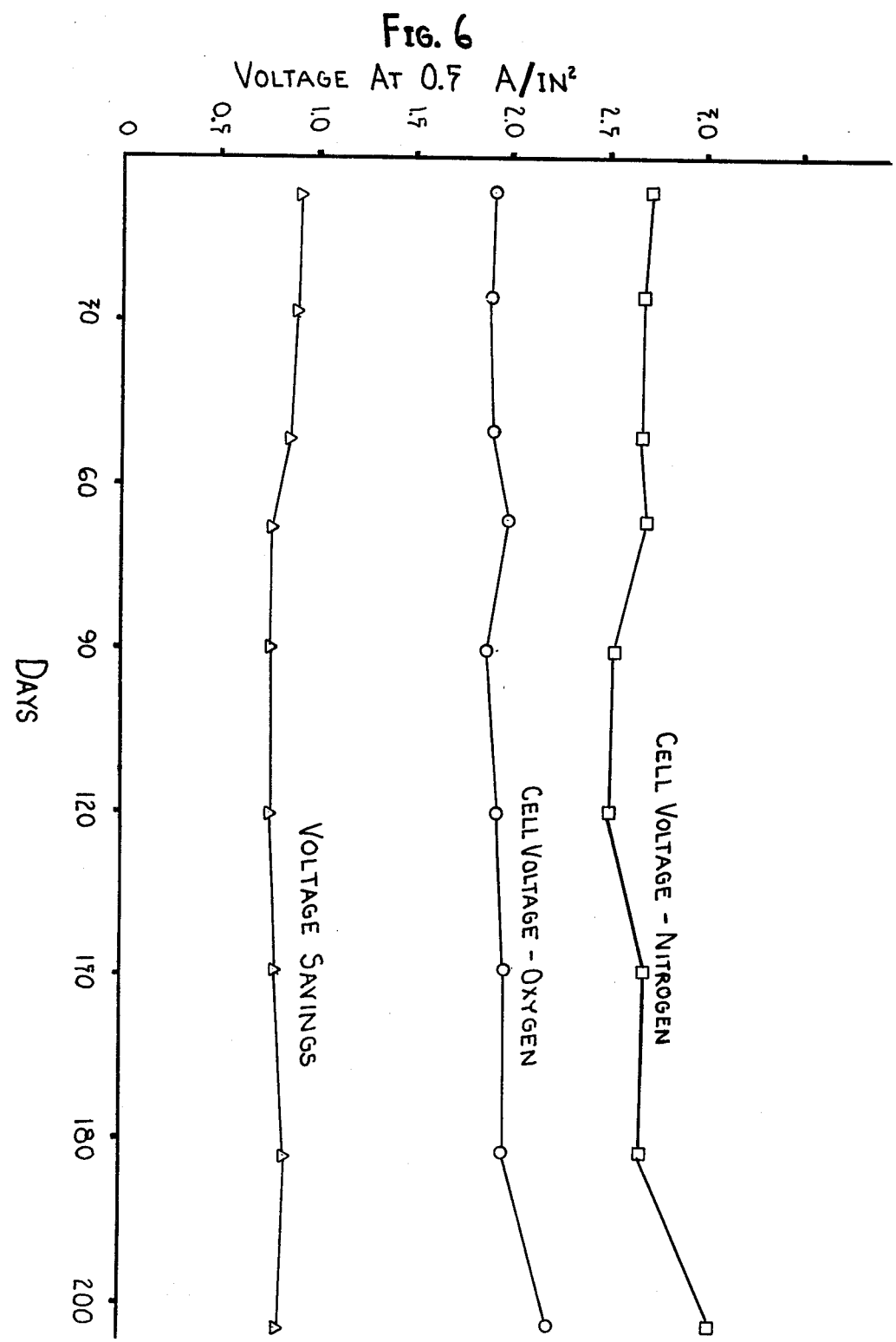

OXYGEN ELECTRODE PREPARATION

BACKGROUND OF THE INVENTION

Gas electrodes are well known in and for electrochemical operations. For their use, a gas is passed in contact with the electrode in the presence of a cooperating electrolyte. Most modern gas electrodes are highly porous and, either inherently or by purposive implementation, catalytically active. Quite importantly, the interior interstitial passageway wall surfaces within the electrode body should have good catalytic capability. Maximization of effective, available reaction-promoting surface area for given unit geometric volumes of the electrode configuration may thus be realized.

The indicated manner of electrode construction is advantageous for oxygen gas-bearing (or depolarized) electrodes, particularly cathodes, that are adapted for the electroreduction of oxygen in alkaline media.

Usage of such electrodes involves passage of the oxygen-bearing gas through the porous electrode body for contact with the involved electrolyte. Such practice is very desirable not only for electrolyzing functions but also for galvanic mode operations, as in fuel cells. Oxygen gas-bearing depolarized cathodes are particularly attractive for chlor-alkali and the like manufacturing cell operations.

A very good reason for employing oxygen gas-bearing porous electrodes to electrolyze common salt brine into chlorine and caustic, and for analogous production purposes, is economic. Significant savings in electrochemical power requirements for given workings are anticipatable due to substantial reductions achievable in needs for applied energy consumption when such electrodes are utilized.

Oxygen electrodes have often been catalyzed by various precious or semi-precious metals and compounds thereof. But, such noble metals as gold, osmium, palladium, platinum, silver, their alloys, oxides and other compositions and so forth are extremely expensive, especially for industrial applications. Thus, their consumption as catalysts for electrode preparation must be carefully controlled. Minimization of total quantity usage is usually done by deposition of precious catalyst materials in the form of thin plating or other layers over a suitable substrate, such as a porous nickel plaque.

It would obviously be desirable to have for ready usage an efficacious yet less costly way to provide satisfactory catalytically-active porous electrodes, especially for use in alkaline media as depolarized cathodes for electrolysis (or even for distinctive galvanic mode purposes).

Manganese oxide materials (including mixtures thereof) are known to be excellent electrocatalysts. These, in particular, include: various forms of manganese dioxide ($MnO_2$); manganic or manganous oxide ($Mn_3O_4$-also known as "hausmannite"); and manganic sesquioxide ($Mn_2O_3$). On reasonable evidence, it is fairly supposed that the $Mn_3O_4$ form is likely the most chemically stable, especially in association with nickel, of the various indicated forms.

Many patent and literature references relate to the preparation and use, in diverse ways, forms and/or combinations, of electrodes involving manganese oxides or manganese peroxides (oftentimes in combination with other electrochemically active materials). These include: U.S. Pat. Nos. 1,296,188; 1,043,937; 1,143,828; 1,423,071; 1,510,172; 3,491,014; 3,535,217; 3,616,302; 3,627,669; 3,775,284; 3,915,837; and 3,948,684; Chemical Abstracts 7:3458; 42:5356c; 50:83b; 74:150359r; 76:62793e; 78:51823p; 79:142363a; 81:57517a; 81:20121r; 83:182053p; and 83:182059v; and Derwent 61865 S/39 and 10379 W/06 (all of which are herein incorporated by reference).

Despite the known art, reliable ways and means to effectively incorporate securely placed deposits of manganese oxide(s) in and for catalyzation of porous electrodes, and the associated desiderata, have heretofore been lacking and wanting; this being especially so in respect of very fine pore, large internal surface area electrodes of newer, modern type and style which are extremely difficult to efficiently internally catalyze when they are not inherently catalytic in nature.

FIELD AND OBJECTIVES OF THE INVENTION

This invention concerns an improved and efficient procedure for catalytically-activating porous electrodes with effective internal placements of manganese oxide deposits (to particularly nicely suite them for electroreduction of oxygen in alkaline media) and the resulting catalyzed electrode products, the technique for which is neither expensive nor complicated and, with high levels of confidence thereabout, gives good and reliable results in practice; the furnishment of same to readily and easily get electrocatalytically-active electrodes characterizably by their having good operability in and good various electrochemical applications being amongst the principal aims and objectives of the present invention.

SUMMARY OF THE INVENTION

The instant contribution to the art is directed to an efficient method of providing an electrocatalytically-active manganese oxide deposit on the interior pore wall surfaces of a porous electrode body comprising: applying a liquid reagent, preferably a dispersion and/or solution of a stable, pyrolytic, anionic-manganese (i.e., in which manganese is the anion) salt to the interior pore walls of the electrode body; then heatng the reagent-bearing electrode at a body temperature between one that is at least at about the decomposition temperature of the reagent and about 700° C. until the reagent decomposes to provide layer deposit formations of desirable manganese oxide catalyst materials on said pore walls.

The atmosphere in which the reagent-bearing electrode body is heated may be inert or, if desired, or unavoidable, of either an oxidizing or reducing nature.

The method step sequence may be repeated until a necessary or desired loading level of said catalyst deposit is attained. Most advantageously, the method of the invention is operated with an additional treatment of a refining nature by a peroxide rinse or bath which is done at least as the final step in the procedure.

The invention also pertains to the advantageous manganese oxide(s) catalyzed porous electrode articles of manufacture obtained as products of the delineated method.

The working proportional details and other significant and more exact specifics of the invention are also ingenuously set forth in the ensuing Specification and description.

ILLUSTRATED REPRESENTATION OF THE INVENTION

Further features and details hereof are brought forth in the ensuing specification and description, taken in conjunction with the accompanying drawing, wherein as therein appears all of the several involved figures are either presentations of data in graphical form or fanciful reproductions of actual catalyzed electrode structures.

PARTICULARIZED DESCRIPTION OF THE INVENTION

Particularly good and securely positioned and fixed placements of desirable manganese oxide forms of deposits for enhancing the electrocatalytic capability of porous electrode bodies (especially those of nickel) are achieved by the following of the indicated practice according to the present invention by: making a good and thoroughly wetting or interior surface covering application of a liquid reagent, for example a dispersion and/or solution, of an anionic-manganese pyrolytic salt upon the interior wall surfaces of the porous electrode body structure to be catalyzed; then subjecting the reagent-laden structure to heat at an elevated temperature not in excess of about 700° C. at or above the decomposition temperature of the involved manganese salt(s) so as to cause deposit formation of electrocatalytically-active manganese oxide(s) on the interior wall surfaces of the structure being catalytically beneficiated. Very beneficially, the deposited manganese oxide(s) formation is subseuently reduced with, preferably, a chemically-active peroxide rinse. Then, optionally and/or if necessary to get adequate or desired catalyst deposit loading in the structure, the procedure may be once or plurally repeated.

The atmosphere in which the reagent pyrolytic manganese salt is converted on and in the electrode structure to a catalytic manganese oxide deposit may be as desired. Thus, it can be inert or of either an oxidizing or reducing nature. Depending on the particular decomposition point of the involved manganese salt, the temperature employed is generally between at least about 250° C. and, the indicated 700° C. maximum. More often and especially with the natural decomposition point variations in the involved anionic-manganese salts, a temperature between about 400° C. and about 600° C. is utilized. Usually, higher heating temperatures tend to result in greater proportions of the desirable $Mn_3O_4$ in the manganese oxide(s) deposition. In all cases, the designated temperature is that of the actual electrode body being treated.

Heating of the reagent-carrying substrate may be done by any desired and appropriately effective means. It may thus be done directly over or in a flame, such as a gas flame propogated by an appropriate burning apparatus. Alternatively, especially when larger production manufacturing operations are called for, directly- or indirectly-fired ovens or the like fueled by gas, electricity or other suitable heating means may be employed for the heating.

The desired atmosphere is, of course, directly controllable during the heating and reagent decomposition-conversion step. An oxidizing atmosphere is readily achieved by keeping the reagent-treated electrode in an ambience of air, oxygen-enriched air or oxygen. The same conditions, obviously, may be created in a heating oven. A reducing atmosphere is readily achieved by keeping the reagent-treated electrode in the fuel-rich and oxygen-lean reducing portion of a heating flame. Equivalent conditions, obviously, may be created in a heating oven by maintaining an ambience of hydrogen (or diluted hydrogen), carbon monoxide, methane, cracked ammonia or other suitable reducing gas atmosphere about the electrode body. Of course, inert atmospheres are readily provided by means of nitrogen, argon or the like blanketing.

The heat-applying treatment is continued until thorough decomposition of the applied manganese salt is achieved. For most normally sized electrode bodies (depending on precise temperature involved) this is most frequently within a time period of 5-10 to 20-30 minutes. Longer heating times can be employed, but are generally not necessary to achieve the desired decomposition of the permanganate.

The manganese oxide phases obtained in the deposited catalyst formations, notwithstanding varying oxidative states of the therein included manganese, are generally found to be distributed throughout the porous electrode body rather than being confined to or concentrated on its external surfaces.

After each deposit-forming heat treatment, the electrode is carefully cooled. After each cooling it is, advantageously, thoroughly leached or washed with water (best hot) for general cleaning purposes. This directly removes easily soluble and loose materials remaining after the catalyst deposition procedure. It may then be dried and used as an electrode. Sometimes, however, intermediate water washing steps may be eliminated, especially when the treated piece is subjected to a subsequent, finishing peroxide treatment.

Preferably and to generally secure utmost benefit from practice of the invention, the treated piece being fabricated (even in water-washed condition) is finally subjected to the reducing (with for example peroxide) post-treatment. This vastly beneficiates the applied deposits of manganese oxide(s) in at least two ways. For one and by the therein involved physical rinsing and scrubbing action, it tends to positively leave a more solid and substantial and better-adhering layer of the catalyst on the interior pore surfaces of the electrode. For another, it tends to chemically reduce the deposited oxide(s) (which although somewhat arcane in nature are almost invariably composed in varying respective proportions of: $MnO_2$; $Mn_2O_3$; and $Mn_3O_4$) to desirably greater occurrences of the $Mn_3O_4$ form.

The peroxide treatment is simply done by rinsing, immersing (or otherwise spraying or passing) the deposit-laden electrode in a suitable peroxide solution. Preferably, aqueous hydrogen peroxide, is employed for the purpose and is used at practically any desired concentration (although 10 or so weight percent aqueous $H_2O_2$ is usually convenient). The peroxide treatment is quite exothermic and substantially heat generating. It may thus be ordinarily commenced with the peroxide bath at normal room or other handling temperature. Contact of the manganese oxide(s) deposit bearing electrode with the peroxide solution generally gives rise to quite vigorous physical bubbling and scrubbing action. This, as indicated, serves to remove during the peroxide treatment a great deal—if not all—of the deposited catalyst material which may have only loosely laid over and not tightly adherent on the electrode after deposition in the decomposing heating steps. Beneficially, this also tends to minimize pore plugging propensities in the treated electode.

After final peroxide treatment (again taking into account individual procedure repetitions to secure desired level of quantity placement of the deposited catalyst), the electrode is again washed and dried. It is then ready for electrochemical usage.

Along this line and if desired, the peroxide treatment may be applied after each reagent application and manganese salt reagent heat treatment; even though it frequently suffices for the treatment to be done only once and at the conclusion of the entire procedure.

It warrants repetition that the peroxide treatment is instrumental in enriching the proportion of $Mn_3O_4$ in the manganese oxide(s) electrode catalyst deposits formed in practice of the present invention. While available evidence displays the activity as oxygen (and other) catalysts of the specific $MnO_2$, $Mn_2O_3$ and $Mn_3O_4$ oxide forms of manganese, the last-mentioned manganic (or -ous) form seems, as has been noted, to lend optimum chemical stability in and with the formed catalyst formation. The particular conditions of heat treatment of the applied pyrolizable manganese salt reagent plus the subsequent peroxide treatment allows relatively specifically different proportions of the three desirable oxides to be present in the resulting deposition. It is, by the way, exceptionally difficult to accurately quantify the relative proportion of individual manganese oxides in a given mixed deposit thereof; this being all due to the different yet closely similar specific compositional forms and altering crystal variations in which they usually occur.

Peculiar as it may seem, analyses made after electrodes have been used in alkaline media in cells show that the oxide remaining in preponderant proportions is $Mn_3O_4$. This is borne out in such authoritative literature sources as "Electrochim. Acta", 20, 221–225 (1975) and the 1966 Edition of the "Atlas of Electrochemical Equilibria In Aqueous Solution". These sources indicate that when a nickel electrode substrate is involved the interaction of the catalyst with the nickel is responsible for the $Mn_3O_4$ build up. The mechanism believed responsible for this is the reduction by nickel of $MnO_2$ (and $Mn_2O_3$) to $Mn_3O_4$ causing oxidation and resulting in formation of nickel hydroxide ($Ni(OH)_2$).

In this connection, microscopic examination of utilized electrodes shows that many manganese oxide catalyzed structures which initially perform quite well (e.g., with voltage savings in a chlor-alkali cell as great as those on the order of 0.7–0.9 volt against the theoretically +1.229 volts savings difference for depolarized electrodes, with which E° is +0.401 volt, as compared to the −0.828 volt E° value with traditionally common chlor-alkali cells) and then unexpectedly fail develop pore-blocking particle growths within the structure. Analysis of the growth, as by X-ray diffraction, identifies the largest proportion of the material as $Ni(OH)_2$.

Figure 2:
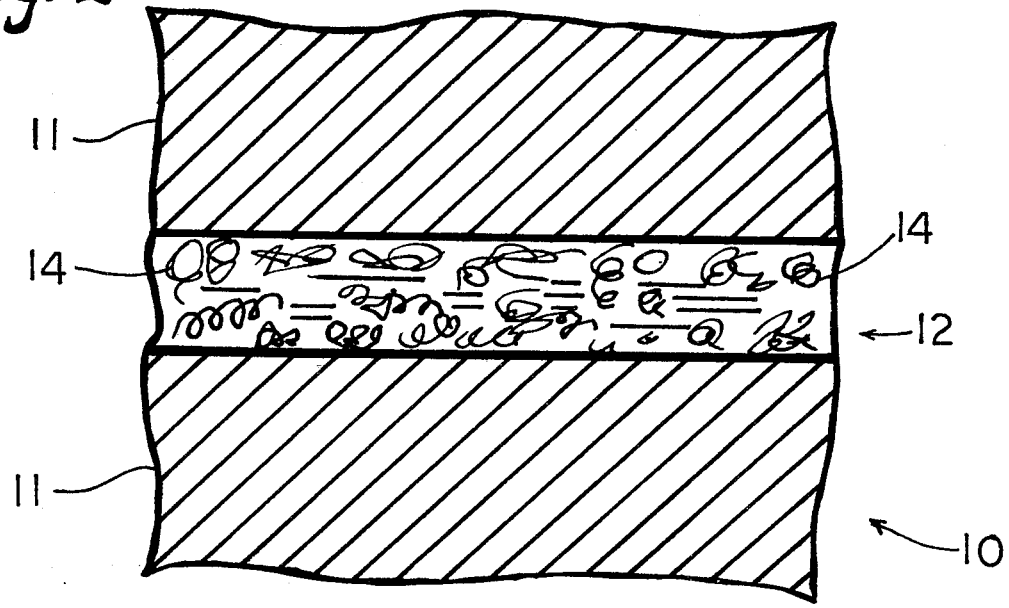

This effect is well illustrated in fanciful representation in FIGS. 1 and 2 of the accompanying Drawing. These, more or less illustrate schematically "before" and "after" illustrations of the potentially blocking action of $Ni(OH)_2$ formation on a metallic nickel substrate as a result of the effect of a caustic (i.e., NaOH) solution on the metallic nickel. In FIGS. 1 and 2, the nickel electrode body is generally represented by reference numeral 10. The porous nickel body, per se, 11 has an idealized pore therethrough represented generally by reference numeral 12. In the "before" representation of the unused electrode of FIG. 1, the manganese oxide catalyst deposit 13 is illustrated as the compact, initially-formed placements made by practice of the present invention. In FIG. 2, the more or less flocculated hydroxide (i.e., $Ni(OH)_2$) formation growth is represented by number 14.

Such hydroxide formation growth is known to be a reason for failure, due to pore blockage, in silver-catalyzed nickel electrodes. The formation of $Ni(OH)_2$ through reaction with manganese oxides, of course, aggravates the pore-blocking possibility.

Similar and analogous phenomena also tends to occur when the electrode is composed of other useful and more or less popular metal substrates in place of nickel, such as iron and cobalt. Hence, the desirability of having as much of the $Mn_3O_4$ form as possible in the catalyst-forming heating step.

Advantageously, the pyrolytic manganese salt reagent employed in practice of the present invention is manganese nitrate, $Mn(NO_3)_2$. Other stable, oxygen-bearing salts can also be utilized such as: manganese carbonate, $MnCO_3$; manganese acetate, $Mn(C_2H_3O_2)_2$; manganese oxalate, $Mn(C_2O_4.H_2O)_2$; manganese octoate, $Mn(C_8H_{15}O_2)_2$; manganese citrate, $Mn(C_6H_5O_7)_2$; and so forth, including other manganese salts of other saturated and unsaturated mono- and dicarboxylic organic acids containing up to as many as about 20 carbon atoms in their structure. It is usually advantageous for the manganese salt reagent to be employed and applied in solution in water or some organic medium such as alcohol, acetone, benzene or other suitable solvent.

However, very fine particle size dispersions of the salt in some suitable, inert liquid carrier may also be suitably employed. For example, this can be one of finely divided $MnCO_3$ in water. Useful dispersions can usually be readily made in many ways, as by formation precipitation of the salt in the desired liquid suspending agent. Thus, excellent and very suitable liquid suspensions for use in practice of the present invention may be often prepared by adjustment or change of the acidity or basicity (even to the extent of going from a low to high pH, or obversely) of solutions, particularly aqueous solutions, of certain desired catalytic agents. Likewise, mere changes in solute strength for a dissolved catalytic agent may sometimes cause a thowing-out or precipitation thereof into a very good and finely divided suspension. Good aqueous manganese carbonate dispersion can be readily prepared by intersecting a manganese chloride, $MnCl_2$, and sodium carbonate, $Na_2CO_3$, in water. Of course, dispersed forms of the reagent must contain particles sized to dimensions smaller than those of the pores in the electrode to be treated.

It is interesting and useful to observe that employment of either an oxidizing or reducing atmosphere provides differently characterizable manganese oxide(s) deposits. For example, $Mn(NO_3)_2$, when decomposed alone in an oxidizing atmosphere usually results in more $MnO_2$ (about 70 percent) than when done in a reducing atmosphere (about 50 percent). Certain of the possible metal substrates which have reducing effects, such as nickel, greatly increase the production of $Mn_3O_4$ when $Mn(NO_3)_2$ is decomposed thereon in oxygen or air.

The reagent is generally best utilized in a concentration best formulated to realize and accommodate desired load levels per dip or reagent application. Sometimes, in this connection, applicating solution strengths as low as 1–2 weight percent of dissolved salt are suitable for the purpose. On the other hand, stronger solutions (or relatively highly concentrated dispersions) of between 5 and 25 weight percent of salt are often useable.

In the cases when suspensions are utilized, solids concentrations of between about 0.015 and 0.2 mg/cc of suspensoid in the involved liquid are found suitable for the purpose.

The wetting or other surface covering application of the pyrolytic manganese salt reagent may be done in any effective way. This includes immersion, spraying or misting application, and so forth. It is generally desirable for the pores of the electrode body to be as full as possible or substantially saturated with the liquid-dispersed reagent before commencing the heat treatment.

The relative quantity of manganese oxide(s) deposit ultimately provided in the electrode body can vary widely in accordance with various factors involved. These include the activity capability of the particular forms of manganese oxide produced in the laid deposit; the number of cycle repetitions, if any, undertaken; and the pore size(s) and actual character of the electrode body being catalyzed. Obviously, deposit loading should not be so heavy as to reach a point beyond which electrodes performance may be diminished by pore blockage and consequent prevention of fluid movement into or through the pores. Also, it is not always necessary or possible to effect continuous deposition formations throughout the pore wall surfaces being catalyzed; it oftentimes being sufficient to have spotty or patched areas of deposit or preferential (or unavoidable) situs areas on which the deposit(s) form(s) without consequent disadvantage or impediment.

Along the line last above mentioned, it is frequently noted that maximum catalyst deposit formations appear to be laid and remain in dual porosity electrode structures at or near the neck-down or bore size change points where the nominal pore dimensions change between associated wall layers respectively containing the differently sized fine and coarse pored interstitial passageways.

Without inflexible limitation to the recited parameters, it is generally desirable for the deposit load level to be at least about 0.005 milligram of catalyst per square centimeter of porous electrode body volume. Maximum deposit loadings (almost unavoidably necessitating a considerable number of repetitive treatments in the operation) may be, on the weight or deposited manganese oxide(s) formation per unit area of electrode body basis, as high as about 7.5 mg/cm$^2$. For most situations, however, suitable deposit loadings are in a range between about 1 and about 2.5 to as much as 4.0 or so mg/cm$^2$.

The base material for the porous electrode bodies is almost invariably metallic. Metals such as nickel and its alloys (including the well known Monel metals and "Inconel"), tantalum or titanium, copper, nickel plated copper, and various ferrous alloys (particularly the so-called stainless or corrosion-resisting steels), are adapted to employment. Nickel is an oftentimes desirable material of construction. The electrode body material should be at least substantially, if not completely, resistant to chemical attack—at least during cell operation—by the contacting electrolyte material that is utilized and oxygen when the electrode is employed as a depolarized cathode.

Appropriate average pore size in the porous electrode bodies to be catalyzed depends, as will be appreciated by those skilled in the art, upon the particular use application to be made thereof. The pores may sometimes be as large as 25–50 microns in diameter. Usually, however, those of nominal pore size diameters in the range of from about 0.1 and about 12 or so microns are adaptable to a wide variety of electrochemical utilizations. It is often more advantageous for this range to be between about 1 and 11 microns; it sometimes being preferable for it to fall in an approximate 3–8 micron nominal diameter span.

Correlative to pore size and multiplicity in any given electrode is its porosity factor. This is usually taken as the percentage by volume of void space in any given unit volume of electrode body. The porosity, as is evident, is the difference upon subtraction from 100 volumetric percent of the percentage of the actual (or apparent) density of any specific electrode mass from the theoretical solid density of the material of construction of the electrode. Porous electrode bodies adapted to be catalyzed by practice of the present invention can ordinarily range in porosity at values of from about 30 to about 90 percent. More commonly, the porosity is on an order between about 60 and about 85 percent.

It is also usually beneficial for the degree of porosity built into the electrode body to be such that the total hole or open area on any given section of exposed surface of the structure provides an adequate proportion of the total area of that exposed surface so as to ensure satisfactory mass transfer capabilities and effects for fluid ingress and egress relative to the electrode body.

Literally any desired configuration and/or body shape can be present in the porous electrodes catalyzed by means of the present invention. Wall section face area size can be as desired; and thickness can be suitable for given intended usages. It is a frequent practice to make the electrode body in a generally thin and flat rectangular or circular plaque form; although various composite structures (such as dual porosity arrangements) and other built-up forms may also be provided. Body thickness in such constructions may be varied in the overall between about 5 and 500 or more mils (ca. 0.13 millimeters and 1.3 or so centimeters). More often it is in the range, frequently occurring as a matter of choice or design, between about 10 and about 250 mils (ca. between about 0.25 millimeters and 0.6 centimeters). In many cases, an appropriate body thickness is found to be between about 15 and about 100 mils (ca. 0.38 and 2.54 millimeters).

EXEMPLIFICATION OF THE INVENTION

To demonstrate the advantageous practice of the present invention, a number of experiments were performed. The testings done and results obtained were as in the following.

In all cases, the electrode bodies were commercially obtained and made of pressed and sintered powered nickel electrode stock. They were in the form of flat, disc-like bodies, each of which had a 2½ inch (ca. 6.35 cm) diameter. The average thickness was 70 mils (ca. 0.178 cm). Unless otherwise specified, each of the electrode bodies was of the dual porosity variety, with a fine pore layer of about 20 mils (ca. 0.051 cm) of the total thickness in which the pores had an average nominal pore diameter size of about 2 microns and a 50 mil (ca. 0.126 cm) coarse pore layer with about 10 micron nominal pore diameters.

In the experimentations run to demonstrate manganese oxide catalyzed electrode efficacy in usage, the catalyzed electrode products were tested in a standard experimental cell. For this, each specimen was separately used an an electrode in which it was mounted for evaluation as a depolarized cathode in the test cell which had expanded titanium mesh anode coated with an oxide of ruthenium and titanium. Anode-to-cathode spacing was 9/32 inch (ca. 0.714 cm) with an intermediate "Nafion" (DuPONT TM) ion exchange membrane separator in the cell. The aqueous anolyte contained 300 g/l NaCl and the catholyte was an aqueous solution containing 100 g/l NaOH; with the cell operated at a temperature of about 60° C. and positive gas pressure on the back side of the cathode. The applied current density was 0.5 amp/in$^2$.

Such testing allows determination upon performance of the measure over increasing time periods of voltage savings realized in the comparisons between operation with both nitrogen and oxygen gases applied to the electrode. The difference—by subtraction—between voltage values obtained from nitrogen (i.e., inert gas) operation at any given point of measure and those from oxygen (i.e., active gas) operation at the same point of measure provides reliable indication of voltage savings obtainable with and corresponding depolarization effect experienced upon use of the electrode as a cathode.

More particularly, the below-described Third through Tenth Examples report the results of the several involved cell testings.

FIRST EXAMPLE

To illustrate typically attainable catalyst loading levels, different electrode specimens were, for each single cycle of operation, first dipped until thoroughly wet in varying concentration aqueous solutions of manganese nitrate Mn(NO$_3$)$_2$; then held at about 250° C. until decomposition of the manganese salt reagent was completed at elevated temperature in either an air or oxygen oxidizing atmosphere and/or in the reducing atmosphere portion of the flame; then washed in water. The cycle was repeated several times with each electrode body tested.

Figure 3:
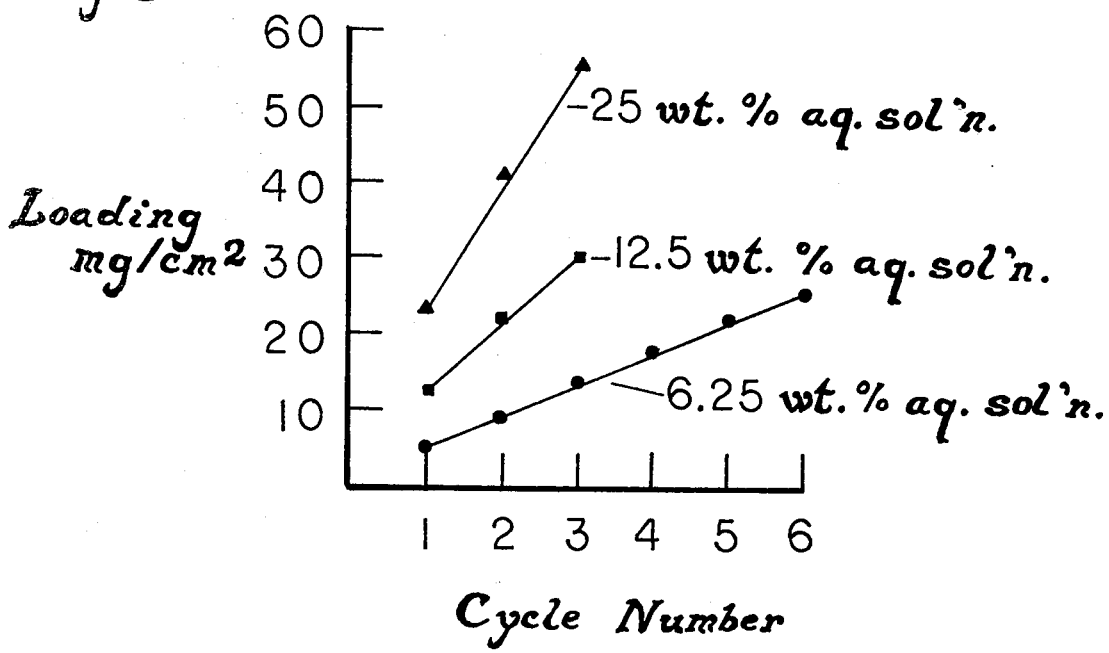
Figure 4:
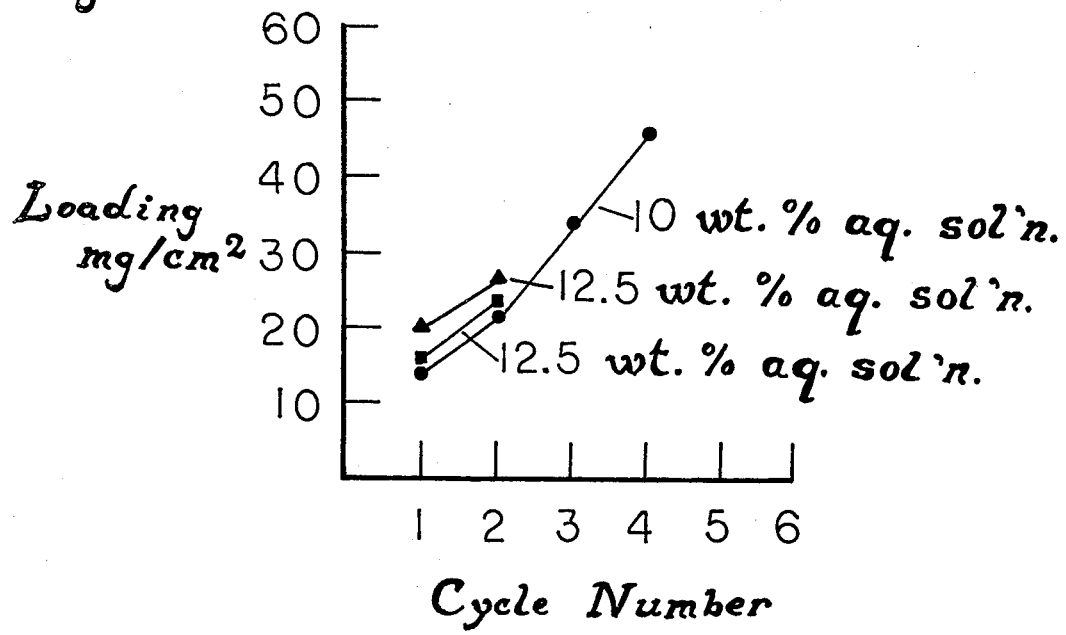

The loading achieved (measured in milligrams per square centimeter of one side face area of the electrode) after each of the consecutive catalyst-depositing cycles conducted are as set forth in FIGS. 3 and 4 of the accompanying drawing, which also contain other pertinent data relevant to the experiments.

With particular reference to FIG. 4 of the Drawing, it is interesting to note the minor variations achieved in loading of ostensibly identical porous substrates with the 12.5% Mn(NO$_3$)$_2$ reagent. This was due, it is believed, to subtle actual differences in pore structure size and configuration arrangement in the respective specimens handled; plus possible indiscernable variations in quantity taken on during the reagent wetting operation.

SECOND EXAMPLE

To demonstrate the tenacious and tightly adhering character of the manganese oxide(s) catalyst depositions prepared according to practice of the present invention, a number of catalyzed electrodes were prepared and run as cathodes in cells of the above-described test style. The cell effluents were collected for one (1) week and analyzed in comparison with the same test conducted on effluent from a conventional chlor-alkali operating cell. The following tabulation identifies the various cathodes tested, how they were prepared and the amount of manganese and nickel seen in the material filtered out of the effluent (i.e., "Solids") and in the filtered solution (i.e., "Solution").

TABLE

| Cathode No. | Decomposition Atmosphere | Post Treatment | Catalyst Loading mg/cm$^2$ | First Weeks' Effluent | | | |
|---|---|---|---|---|---|---|---|
| | | | | Solids | | Solution | |
| | | | | ppm Mn | ppm Ni | ppm Mn | ppm Ni |
| "A" | Air | 10% H$_2$O$_2$ | 4.2 | 0.44 | 0.27 | 0.28 | 0.07 |
| "B" | Oxygen | — | 5.0 | 1.36 | 1.74 | 0.12 | 0.04 |
| "C" | " | 10% H$_2$O$_2$ | 5.0 | 0.35 | 0.09 | Not Analyzed | |
| Convention Cell | — | — | | N.D. | N.D. | N.D. | 0.03 |

N.D. - None Detectable

THIRD EXAMPLE

The catalyst was deposited on the test electrode by dipping once in a 5% Mn(NO$_3$)$_2$ aqueous solution followed by heating in oxygen at 250° C. No post treatment was used. The final loading was 5.0 mg/cm$^2$; this being Cathode "B" in the foregoing Table.

A good and effective starting depolarization during cell test on oxygen of this cathode was observed. But, after 22 days, the depolarization inexplicably was down to about 0.3 V. At this time, the cell was dismantled.

FOURTH EXAMPLE

The catalyst was deposited by one dip in a 5% Mn(NO$_3$)$_2$ aqueous solution followed by decomposition in air at 250° C. The final loading was 7.3 mg/cm$^2$. Initial depolarization testing was good at 0.88 V.

FIFTH EXAMPLE

The catalyst was deposited as for that of the Third Example. The catalyzed piece was then soaked over night in a 10% H$_2$O$_2$ aqueous solution. The final loading was 5.0 mg/cm$^2$. On test, the depolarization value was 0.84 V. This, incidentally, was Cathode "C" in the Table of the Second Example.

SIXTH EXAMPLE

The catalyst was deposited by dipping in a 12.5% Mn(NO$_3$)$_2$ aqueous solution and decomposition at 250° C. in air. Two dip-fire cycles were used. No post peroxide treatment was applied. The final loading was 23.2 mg/cm$^2$.

The cathode performed with an initial depolarization on oxygen of 0.40 V. An increase in gas pressure from 5 psi to 12 psi increased the depolarization significantly.

SEVENTH EXAMPLE

The catalyst was deposited as described for that in the Sixth Example. No post treatment was used. The final loading was 25.3 mg/cm$^2$. Performance was similar to that obtained with the cathode product of the Sixth Example.

EIGHTH EXAMPLE

The catalyst was deposited by one dip in an aqueous solution containing 5% $Mn(NO_3)_2$ followed by heating in air to 250° C. The final loading was 7.6 mg/cm$^2$.

The cathode performed well with about 0.80 V initial depolarization on oxygen.

NINTH EXAMPLE

The cathode was reinforced with an "Exmet" expanded nickel lath screen. It was catalyzed using a 12.5% $Mn(NO_3)_2$ aqueous solution and decomposition at 250° C. in air. Three dip-fire cycles were used. No post treatment was applied. The final loading was 30.5 mg/cm$^2$.

This cathode performed quite well during the period it was tested. Initial depolarization on oxygen was 0.91 V. At Day 21, it was 0.77 V. The results are graphically portrayed in FIG. 5 of the accompanying drawing.

TENTH EXAMPLE

The catalyst was deposited by dipping once in a 5% $Mn(NO_3)_2$ aqueous solution followed by heating at 250° C. in air. The cathode piece was then soaked in 10% $H_2O_2$ overnight. The final loading was 4.2 mg/cm$^2$ (this being Cathode "A" in the Table above). The performance was steady at ~0.80 V depolarized running the test cell on oxygen for two weeks.

ELEVENTH EXAMPLE

The piece of nickel, 16.859 g, was placed in a holder consisting of 2 pieces of 0.25 steel plate each with a 2.5 inch diameter hole therein. The nickel was then clamped in the holder. A few milliliters of a 12.5% $Mn(NO_3)_2$ aqueous solution was poured onto the large pore side of the nickel, thoroughly covering the surface. As this soaked in, the assembly was placed in an oven at 250° C. with free access to the air and left in that condition for 64.5 hours. Following some cooling at 100° C., the holder was removed from the oven and allowed to cool to room temperature. The nickel was then re-weighed, it then being 18.047 G. Its gravimetric characteristics were as follows:

Final Weight: 18.047 g
Initial Weight: 16.859 g
Yielding: 1.188 g of deposited catalyst or 1.23 oz/ft$^2$ of catalyst laid.

The electrochemical performance of this catalyzed electrode was then made with good results as shown in FIG. 6 of the accompanying drawing.

When the foregoing is duplicated excepting to use (as the pyrolyzable manganese salt reagent in place of $Mn(NO_3)_2$), manganese acetate, manganese oxalate, manganese octoate or manganese carbonate, analogous good and satisfactory results are realized. The same is achieved when the catalyst deposits are made from $Mn(NO_3)_2$ or other suitable manganese salt reagents on porous electrodes of other substrate material, such as cobalt and iron.

Many changes and modifications can readily be made and adapted in embodiments in accordance with the present invention without substantially departing from its apparent and intended spirit and scope, all in pursuance and accordance with same as it is set forth and defined in the hereto appended claims.

What is claimed is:

1. Method of providing an electrocatalytically-active manganese oxide deposit on the interior pore wall surfaces of a porous electrode body comprising:
    applying to the interior walls of the electrode body a liquid, anionic-manganese pyrolytic salt reagent selected from the group consisting of manganese nitrate, manganese carbonate, carboxylic acid salts of manganese containing up to about 20 carbon atoms in the organic acid radical portion of the salt, and mixtures thereof; then
    heating the reagent-bearing electrode at a body temperature between one that is at least at about the decomposition temperature of the reagent and about 700° C. until the reagent decomposes to manganese oxide(s) layer deposit formations on said pore walls; and
    washing and refining the deposit laden body with an aqueous hydrogen peroxide solution.

2. Method of providing an electrocatalytically-active manganese oxide deposit on the interior pore wall surfaces of a porous electrode body comprising:
    applying to the interior walls of the electrode body a liquid, anionic-manganese pyrolytic salt reagent selected from the group consisting of manganese nitrate, manganese carbonate, carboxylic acid salts of manganese containing up to about 20 carbon atoms in the organic acid radical portion of the salt, and mixtures thereof; then
    heating the reagent-bearing electrode at a body temperature between one that is at least at about the decomposition temperature of the reagent and about 700° C. until the reagent decomposes to manganese oxide(s) layer deposit formations on said pore walls;
    sequentially repeating the reagent wetting step and the heating step until the said deposit formations are adequate in quantity to leave a deposit loading of the electrode that is between about 0.005 and about 7.5 milligrams of manganese oxide(s) catalyst per cubic centimeter of porous electrode body volume; and
    washing and refining the deposit laden body with an aqueous hydrogen peroxide solution.

3. The method of claims 1 or 2, wherein the reagent-bearing electrode is heated in a gaseous oxidizing atmosphere.

4. The method of claims 1 or 2, wherein the reagent-bearing electrode is heated in a gaseous reducing atmosphere.

5. The method of claims 1 or 2, wherein said liquid dispersion of the manganese salt reagent is an aqueous solution.

6. The method of claims 1 or 2, wherein said reagent wetting and heating steps are sequentially repeated until the said deposit formations are adequate in quantity to leave a deposit loading of the electrode that is between about 1 and about 2.5 milligrams of manganese oxide(s) catalyst per cubic centimeter of porous electrode body volume.

7. The method of claims 1 or 2, wherein the said temperature is between about 250° C. and about 600° C.

8. The method of claims 1 or 2, wherein the manganese salt reagent is manganese nitrate.

9. The method of claims 1 or 2, wherein the manganese salt reagent is manganese acetate.

10. The method of claims 1 or 2, wherein the manganese salt reagent is manganese oxalate.

11. The method of claims 1 or 2, wherein the electrode body is comprised of nickel.

12. Method of providing an electrocatalytically-active manganese oxide deposit on the interior pore wall surfaces of a porous electrode body consisting essentially of applying to the interior walls of the electrode body a liquid, anionic-manganese pyrolytic salt reagent selected from the group consisting of manganese nitrate, manganese carbonate, carboxylic acid salts of manganese containing up to about 20 carbon atoms in the organic acid radical portion of the salt; and mixtures thereof; then heating the reagent-bearing electrode at a body temperature between one that is at least at about the decomposition temperature of the reagent and about 700° C. until the reagent decomposes to manganese oxide(s) layer deposit formations on said pore walls; washing and refining the deposit laden body with an aqueous hydrogen peroxide solution; and sequentially repeating the reagent wetting step; the heating step and washing step until the said deposit formations are adequate in quantity to leave a deposit loading of the electrode that is between about 0.005 and about 7.5 milligrams of manganese oxide(s) catalyst per cubic centimeter of porous electrode body volume.

13. The product produced by the method of claims 1 or 2.

* * * * *

UNITED STATES PATENT AND TRADEMARK OFFICE
CERTIFICATE OF CORRECTION

PATENT NO. : 4,269,691

DATED : May 26, 1981

INVENTOR(S) : Gary A. Deborski

It is certified that error appears in the above-identified patent and that said Letters Patent are hereby corrected as shown below:

Col. 2, line 22, delete "suite" and insert --suit--.

Col. 2, line 43, delete "heatng" and insert --heating--.

Col. 2, line 51, delete the comma after "desired".

Col. 3, line 25, after "C" add --but--.

Col. 3, line 31, delete "subseuently" and insert --subsequently--.

Col. 4, line 64, after "have" insert --been--.

Col. 6, line 43, delete "thowing" and insert --throwing--.

Col. 6, line 46, delete "intersecting" and insert --interacting--.

Cols. 9 and 10, under Table, first column, delete "Convention" and insert --Conventional--.

Col. 10, line 37, delete "0.3V." and insert --0.30V.--.

Signed and Sealed this

Twenty-second Day of September 1981

[SEAL]

Attest:

GERALD J. MOSSINGHOFF

*Attesting Officer*  *Commissioner of Patents and Trademarks*